(12) United States Patent
Haba (10) Patent No.: US 6,465,986 B1
(45) Date of Patent: *Oct. 15, 2002

(54) BATTERY NETWORK WITH COMPOUNDED INTERCONNECTIONS

(75) Inventor: Chaz G. Haba, North Hills, CA (US)

(73) Assignee: Planet Electric, Inc., North Hills, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/459,006

(22) Filed: Mar. 24, 2000

Related U.S. Application Data (60) Provisional application No. 60/111,930, filed on Dec. 11, 1998.

(51) Int. Cl.[7] .......................... H02J 7/00; H01M 10/38
(52) U.S. Cl. ........................................ 320/116; 429/123
(58) Field of Search ................................. 320/116, 117, 320/120, 121; 429/123, 149

(56) References Cited

U.S. PATENT DOCUMENTS

| | | |
|---|---|---|
| 1,117,493 A | 11/1914 | Hutchinson |
| 3,182,742 A | 5/1965 | Dow |
| 3,202,900 A | 8/1965 | McGivern |
| 3,794,133 A | 2/1974 | Sugiura et al. |
| 3,818,292 A | 6/1974 | Berman |
| 3,886,426 A | 5/1975 | Daggett |
| 3,904,947 A | 9/1975 | Crews |
| 3,943,420 A | 3/1976 | Hind |
| 4,079,303 A | 3/1978 | Cox |
| 4,096,418 A | 6/1978 | Marumoto et al. |
| 4,146,825 A | 3/1979 | Harhay |
| 4,277,737 A | 7/1981 | Muller-Werth |
| 4,313,080 A | 1/1982 | Park |
| 4,513,167 A | 4/1985 | Brandstetter |
| 4,575,670 A | 3/1986 | Hignutt |
| 4,651,080 A | 3/1987 | Wallace |
| 4,707,420 A | 11/1987 | Wedlake |

(List continued on next page.)

FOREIGN PATENT DOCUMENTS

| | | |
|---|---|---|
| EP | 0 320 831 A2 | 6/1989 |
| GB | 2 206 726 A | 1/1989 |
| GB | 2 295 718 A | 6/1996 |
| JP | 10154503 | 6/1998 |
| WO | WO 83/03925 | 11/1983 |
| WO | WO 87/07982 | 12/1987 |

OTHER PUBLICATIONS

International Search Report Relevant to 09/459,006 dated Jun. 9, 2000.
European Search Reportrelevant to 09/459,006 dated Apr. 18, 2000.

Primary Examiner—Peter S. Wong
Assistant Examiner—Gregory J. Toatley, Jr.
(74) Attorney, Agent, or Firm—Planet Electric, Inc.

(57) ABSTRACT

A battery operating system includes an array of individual component batteries configured with compound series parallel connections to form a network. The array of individual component batteries is configured to provide a two-dimensional battery network having X columns and Y rows. Each column in the network comprises Y batteries electrically connected in series to form a string of batteries. Each of the X columns or strings are then further electrically connected together in parallel, to produce a network of X columns of batteries connected together in parallel, each of the X columns having Y batteries connected together in series. Finally, each of the individual component batteries is further configured with compound interconnections, such that each of the individual component batteries are connected in parallel with all adjacent individual component batteries in the same row.

13 Claims, 6 Drawing Sheets

U.S. PATENT DOCUMENTS

| | | |
|---|---|---|
| 4,943,494 A | 7/1990 | Riley |
| 5,235,232 A | 8/1993 | Conley et al. |
| 5,422,558 A | 6/1995 | Stewart |
| 5,447,808 A | 9/1995 | Molyneux |
| 5,549,172 A | 8/1996 | Mutoh et al. |
| 5,617,004 A | 4/1997 | Kaneko |
| 5,629,601 A | 5/1997 | Feldstein |
| 5,633,097 A | 5/1997 | Miller et al. |
| 5,703,464 A | 12/1997 | Karunasiri |
| 5,710,504 A | 1/1998 | Pascual et al. |
| 5,744,936 A * | 4/1998 | Kawakami ................. 320/120 |
| 5,898,291 A * | 4/1999 | Hall ........................... 320/121 |
| 5,952,815 A * | 9/1999 | Rouillard et al. ........... 320/116 |
| 6,097,174 A * | 8/2000 | Yang et al. ................. 320/119 |

* cited by examiner

BATTERY NETWORK WITH COMPOUNDED INTERCONNECTIONS

CROSS-REFERENCE TO RELATED APPLICATIONS

This patent application claims the benefit of the filing date of United States Provisional Patent Applications Serial Nos. 60/111,930, filed Dec. 11, 1998 and entitled "BATTERY NETWORK WITH COMPOUNDED INTERCONNECTIONS," the entire contents of which are hereby expressly incorporated by reference.

FIELD OF THE INVENTION

The present invention relates generally to energy storage systems, and more particularly, to a battery network with compounded connections.

BACKGROUND OF THE INVENTION

While the use of electricity, instead of gasoline, to power vehicles has been known for many years, electric vehicles (EVs) have started to become increasingly popular in recent years. For example, December 1996 marked the debut of General Motor's EV1 electric vehicle.

One of the most critical components to the overall performance of an EV is the energy storage system, which provides the power necessary to operate the vehicle. A typical energy storage system for an EV includes a battery pack comprising one or more batteries that are electrically connected together in a certain configuration to provide desired performance characteristics. Most prior art EV energy storage systems focus on high voltage, high current solutions to providing the necessary power to the EV. The underlying assumption behind these prior art attempts is that in order to provide the power to move an EV at the desired speeds, relatively high current levels are required. The EV1, for example, includes a battery pack consisting of 26 Valve-Regulated Lead Acid (VRLA) modules electrically connected together in a single series string for an available voltage of 312 Volts and a storage capacity of about 16.3 kW.

Figure 1:
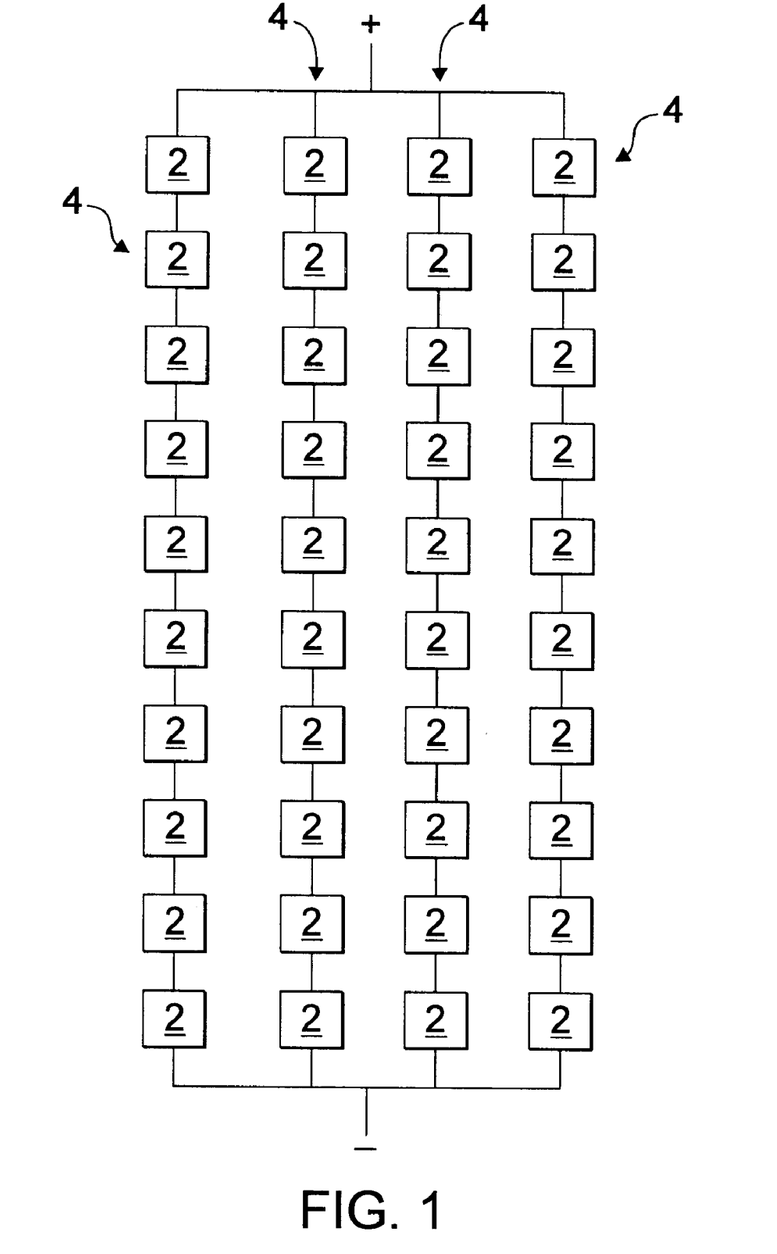
FIG. 1 is a schematic illustration of a battery network according to prior art.

As shown in FIG. 1, other similar prior art approaches involve connecting a number of monolithic component batteries 2 in a single series column 4 and connecting a couple of such columns 4 at each end of the column in parallel to reach the desired total pack voltage.

There are, however, a number of significant disadvantages associated with these prior art approaches. For example, a battery pack constructed as a single series string is inherently susceptible to high failure rates, because the failure of any individual battery component in the pack automatically results in total battery pack failure (or the failure of the entire respective column of batteries) through an open circuit as no current flow can occur through the pack during either discharge or re-charge of the battery pack.

Additionally, the performance of a battery pack comprising component batteries connected together as a single series string is limited by the weakest battery in the string, both during discharge and re-charge. During discharge, the current delivery capacity of the entire battery pack is limited to that of the individual component battery with the lowest capacity in the string. Likewise, during charging of the battery pack, the individual component battery with the lowest capacity reaches a state of full charge first, and limits the re-charging of the entire battery pack.

Moreover, the individual component battery within such battery pack with the lowest capacity is over-discharged during each discharge cycle and over-charged during each charge cycle. Both of these conditions are damaging to battery capacity and cycle life. Thus, the normal cycling of a battery pack constructed a single series string provides an inherently unstable situation in which the weakest component batteries tend to become weaker still, converging toward failure of these members and, ultimately, the entire battery pack.

Furthermore, the EV1 battery pack draws a high level of current through each of the individual component batteries in series. As a result, a higher depth of discharge (DOD) is required during operation, which adversely affects the cycle life of the individual component batteries and the battery pack as a whole.

In addition to the operational disadvantages associated with the prior art battery packs, there are also some significant structural disadvantages. For example, the EV1 battery pack weighs 1175 lbs and thus is a significant component of the overall weight of the EV, negatively impacting the potential range of the vehicle before needing recharging.

Consequently, a need exists for an improved energy storage system, and more particularly for an improved battery operating system for EVs.

SUMMARY OF THE INVENTION

The present invention, therefore, provides an improved battery operating system for EVs designed to overcome the disadvantages described above. An array of individual component batteries are connected in compounded series and parallel connection to form a battery network. In accordance with the present invention, a battery network is formed by construction of a two- or three-dimensional array of individual batteries. The battery network thus formed comprises sufficient individual batteries connected in series so that the series voltage of the individual node batteries sum to the desired overall battery package voltage. In addition, the battery network thus formed comprises sufficient individual batteries connected in parallel so that parallel connection of individual node batteries sums the current delivery capacity to the desired overall battery package current delivery capacity.

In one embodiment, an X by Y two-dimensional array of individual battery components is formed by connecting each node battery in the array to its nearest neighbor nodes with both series and parallel connections using an electrically conductive material. The array of individual component batteries is configured to provide a two-dimensional battery network having X columns and Y rows. Each column in the network includes Y batteries electrically connected in series to form a string of batteries. Each of the X columns or strings are then further electrically connected together in parallel, to produce a network of X columns of batteries connected together in parallel, each of the X columns having Y batteries connected together in series. Finally, each of the individual component batteries is further configured with compound interconnections, such that each of the individual component batteries are connected in parallel with all adjacent individual component batteries in the same row.

These and other features and advantages of the present invention will be appreciated as the same become better understood by reference to the following detailed description when considered in connection with the accompanying drawings.

DETAILED DESCRIPTION

Figure 2:
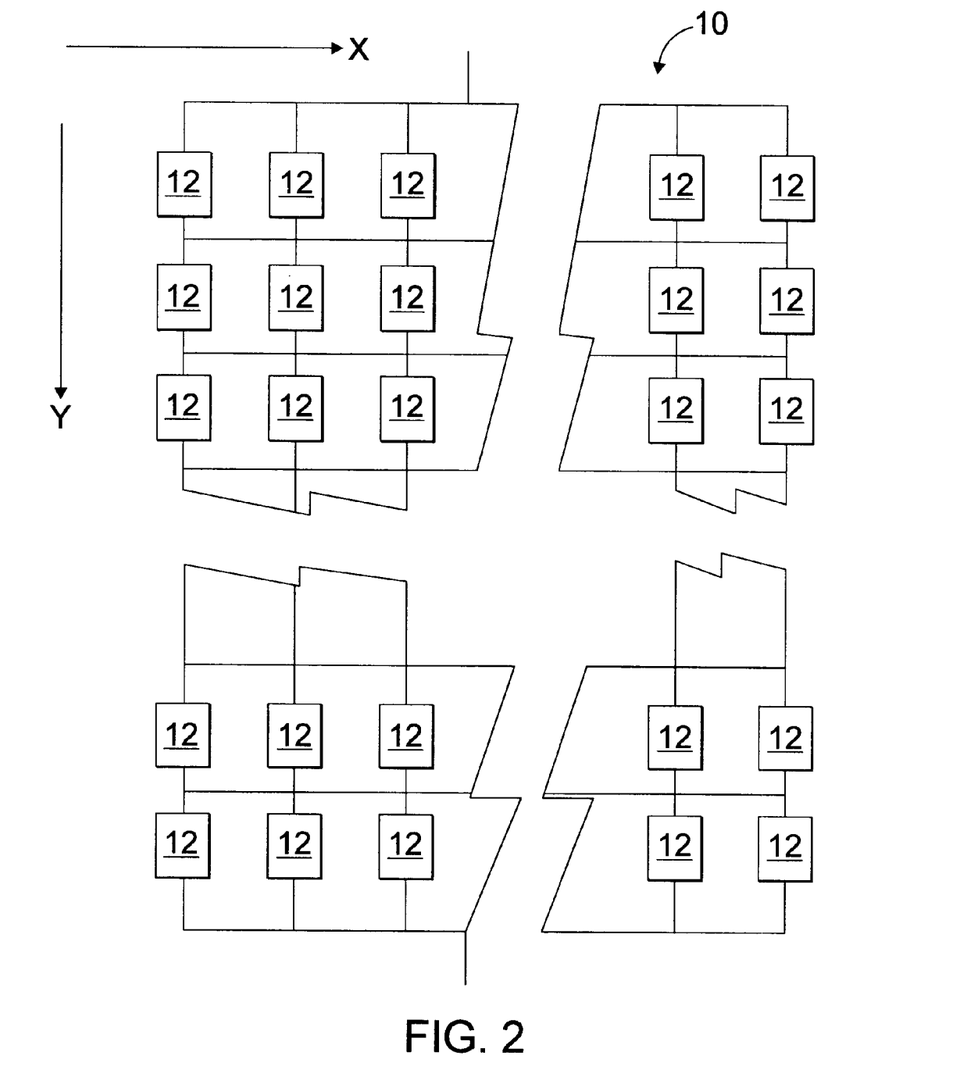
FIG. 2 is a schematic illustration of a battery network according to the present invention, wherein an array of individual component batteries is configured in a network having X columns and Y rows.
Figures 3A, 3B:
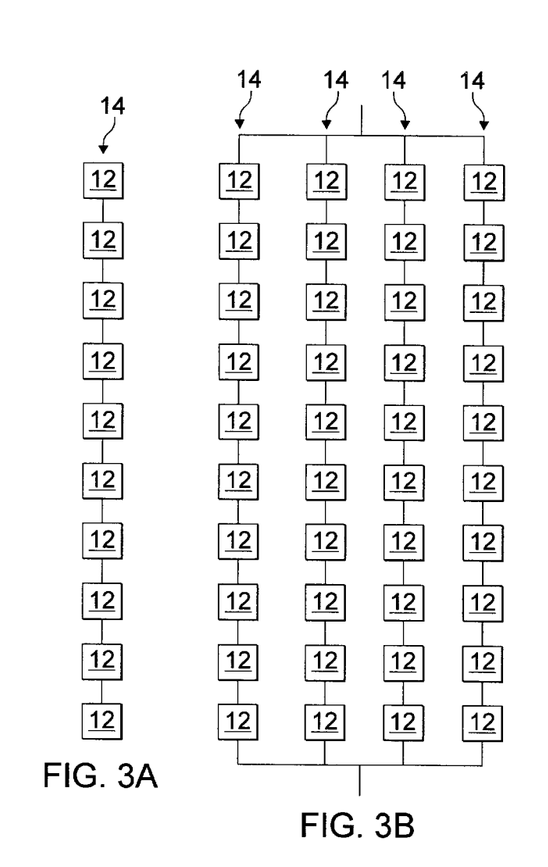
FIG. 3A is a schematic illustration of one of the strings in the battery network of FIG. 2, wherein a plurality of individual component batteries is connected in series.
FIG. 3B is a schematic illustration of the battery network of FIG. 3A, further configured with parallel connections, wherein a plurality of strings are connected in parallel, each of the plurality of strings constructed of a plurality of individual component batteries connected in series.
Figure 3C:
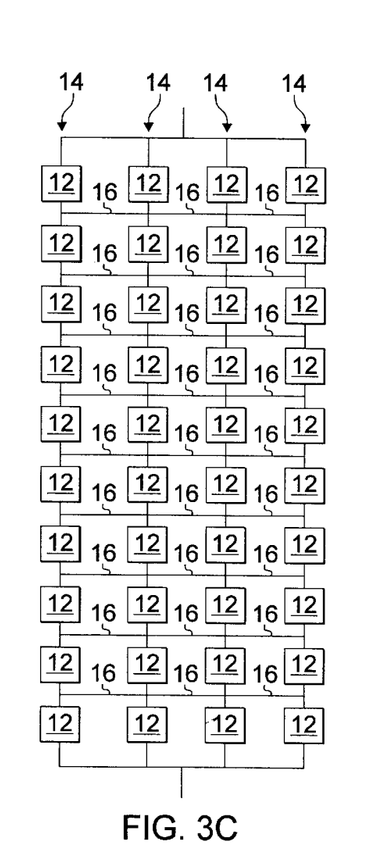
FIG. 3C is a schematic illustration of the battery network of FIG. 3B further configured with compound interconnections, wherein each of the individual component batteries are connected with series and parallel connections to all adjacent individual component batteries in the network.

FIG. 2 schematically illustrates a battery operating system 10 according to the present invention. In the illustrated embodiment, the battery operating system 10 includes an array of individual component batteries 12 configured with compound series parallel connections to form a network. Specifically, the array of individual component batteries 12 is configured to provide a two-dimensional battery network having X columns and Y rows. Each column in the network includes Y batteries electrically connected in series to form a string of batteries 14 (FIG. 3A). Each of the X columns or strings 14 are then further electrically connected together in parallel, to produce a network of X columns of batteries connected together in parallel, each of the X columns having Y batteries 12 connected together in series (FIG. 3B). Finally, each of the individual component batteries is further configured with compound interconnections 16, such that each of the individual component batteries 12 is connected in parallel with all adjacent individual component batteries in the same row (FIG. 3C). The series, parallel and compound connections in the battery network may be made by any suitable means, and one embodiment the mechanical connections are made using electrical conductors of sufficient current carrying capacity.

The number of individual component batteries in the network is a function of the desired characteristics of the total network and the individual component battery characteristics. The number of batteries connected in series in a column is a function of the desired total voltage and the individual component battery voltages. Each column of the battery network contains Y batteries linked in series to produce an output voltage equal to the sum of the output voltage of each of the individual component batteries in that column. For example, in order to produce a 24V battery pack using two 12V, 12A batteries, the two batteries are connected in series to produce a 24A, 12A battery pack.

Likewise, the number of columns connected in parallel is a function of the desired total current and the individual component battery current delivery capacity. The X columns of the battery network are connected in parallel to produce an output current equal to the sum of the current flowing through each one of the strings. For example, in order to produce a 24A battery pack using two 12V, 12A batteries, the two batteries are connected in parallel to produce a 12V, 24A battery pack.

Figure 4:
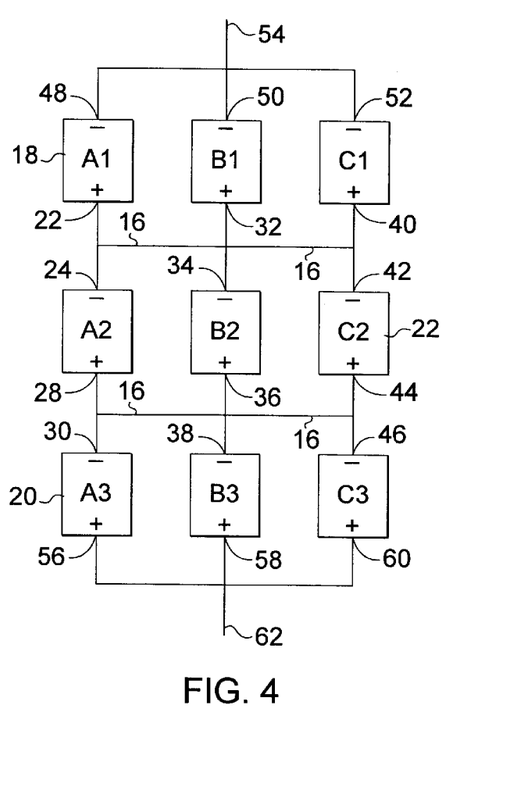
FIG. 4 is a schematic illustration of the battery network of FIG. 2, wherein an array of nine individual component batteries are configured into a network having three columns and three rows.

Referring now to FIG. 4, a battery network according to the present invention is illustrated where X, the number of columns or strings, is three and Y, the number of rows or individual component batteries in each string, is three. In other words, the battery network is constructed from an array of nine batteries arranged in three columns of three batteries each. For ease of understanding, the columns are designated, from left to right, column A–C, and the rows are designated, from top to bottom, as row 1–3. Using these designations, each individual component battery can be referred to using a set of coordinates defining the column and row location of the battery in the network. For example, battery 18 can be referred to as (A,l), designating its location in column A, row 1 of the network. Likewise, battery 20 can be referred to as (A,3) designating its location in column A, row 3 of the network and battery 22 can be referred to as (C,2) designating its location in column C, row 2 of the network.

Referring still to FIG. 4, the electrical connections of the battery network will be described in more detail. In column A, the positive electrode 22 of battery (A,1) is connected in series to the negative electrode 24 of battery (A,2), and the positive electrode 28 of battery (A,2) is electrically connected in series to the negative electrode 30 of battery (A,3). In column B, the positive electrode 32 of battery (B,1) is electrically connected in series to the negative electrode 34 of battery (B,2) and the positive electrode 36 of battery (B,3) is electrically connected in series to the negative electrode 38 of battery (B,3). In column C, the positive electrode 40 of battery (C,1) is electrically connected in series to the negative electrode 42 of battery (B,2) and the positive electrode 44 of battery (B,2) is electrically connected in series to the negative electrode 46 of battery (B,3). Additionally, the negative electrodes 48, 50, 52 of the batteries in row 1 are electrically connected together in parallel to provide a negative terminal 54 for the entire battery network, and the positive electrodes 56, 58, 60 of all the batteries in row 3 are electrically connected together in parallel to provide a positive terminal 62 for the entire battery network.

The network also contains compound interconnections 16. In row 1, the positive electrode 22 of battery (A,1) is electrically connected in parallel to the positive electrode 32 of battery (B,1) and the positive electrode 32 of battery (B,1) is electrically connected in parallel to the positive electrode 40 of battery (C,1). In row 2, the negative electrode 24 of battery (A,2) is electrically connected in parallel to the negative electrode 34 of battery (B,2) and the negative electrode 34 of battery (B,2) is electrically connected in parallel to the negative electrode 42 of battery (C,2). Additionally, the positive electrode 28 of battery (A,2) is electrically connected in parallel to the positive electrode 36 of battery (B,2) and the positive electrode 36 of battery (B,2) is electrically connected in parallel to the positive electrode 44 of battery (C,2). In row 3, the negative electrode 30 of battery (A,3) is electrically connected in parallel to the negative electrode 38 of battery (B,3) and the negative electrode 38 of battery (B,3) is electrically connected in parallel to the negative electrode 46 of battery (C,3).

Figure 5:
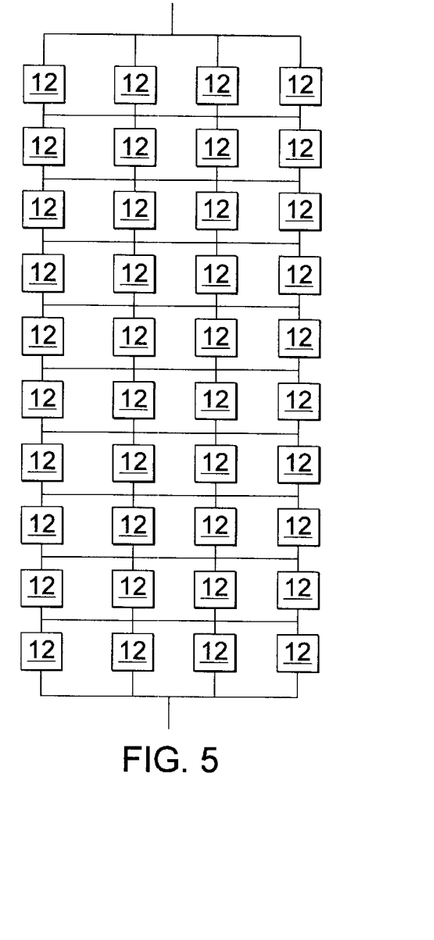
FIG. 5 is a schematic illustration of the battery network of FIG. 2, wherein an array of forty individual component batteries are configured into a network having four columns and ten rows.

One embodiment of the battery network according to the present invention is illustrated in FIG. 5, where X, the number of columns or strings, is four and Y, the number of rows or individual component batteries in each string, is ten. More specifically, an array of forty individual component batteries 12 is configured into a network of four strings of ten batteries each with compound series parallel connections.

The only difference between the battery networks illustrated in FIGS. 3 and 4 is the number of individual component batteries, and the number of rows and columns in the network. In all other aspects the two networks are functionally, structurally and operationally identical. As described above, the battery network illustrated in FIG. 5 is constructed by connecting with series and parallel connections each individual component battery in the array to all adjacent individual component batteries in the array. Each column of the array is constructed by connecting the positive electrode of each individual component battery in the column to the negative electrode of the adjacent individual component battery in that column. Each row of the array is constructed by connecting the positive electrode of each individual component battery in that row to the positive electrodes of the adjacent individual component batteries in that row, and connecting the negative electrode of each individual component battery in that row to the negative electrodes of the adjacent individual component batteries in that row.

Present embodiments of the battery network illustrated in FIG. 5 use lead-acid batteries for the individual component batteries in the network. More specifically, present embodiments use Uninterruptable Power Source (UPS) batteries, such as those available from [MFG,SUPPLER, LOCATION, PART NUMBER]. The UPS batteries are 12V batteries that have a 12 Ah capacity, and are therefore capable of producing (12V×12A) 144 W of power. When an array of forty of these batteries are connected together with compound series parallel connections, as illustrated in FIG. 5, the result is a 120V (ten 12V batteries in series), 48A (four 12A strings of batteries in parallel) battery pack. The resulting pack is therefore able to produce (120V×48A) 5.76 kW of power. Although the described embodiment of the battery operating system is a 120V, 48A battery pack, it should be realized that the battery pack may alternatively be configured, within the scope of this invention, to have different ratings and/or capacity. For example, lithium-ion or lithium-ion solid polymer batteries with different ratings may be used for savings in weight and size and increase in energy.

Figure 6:
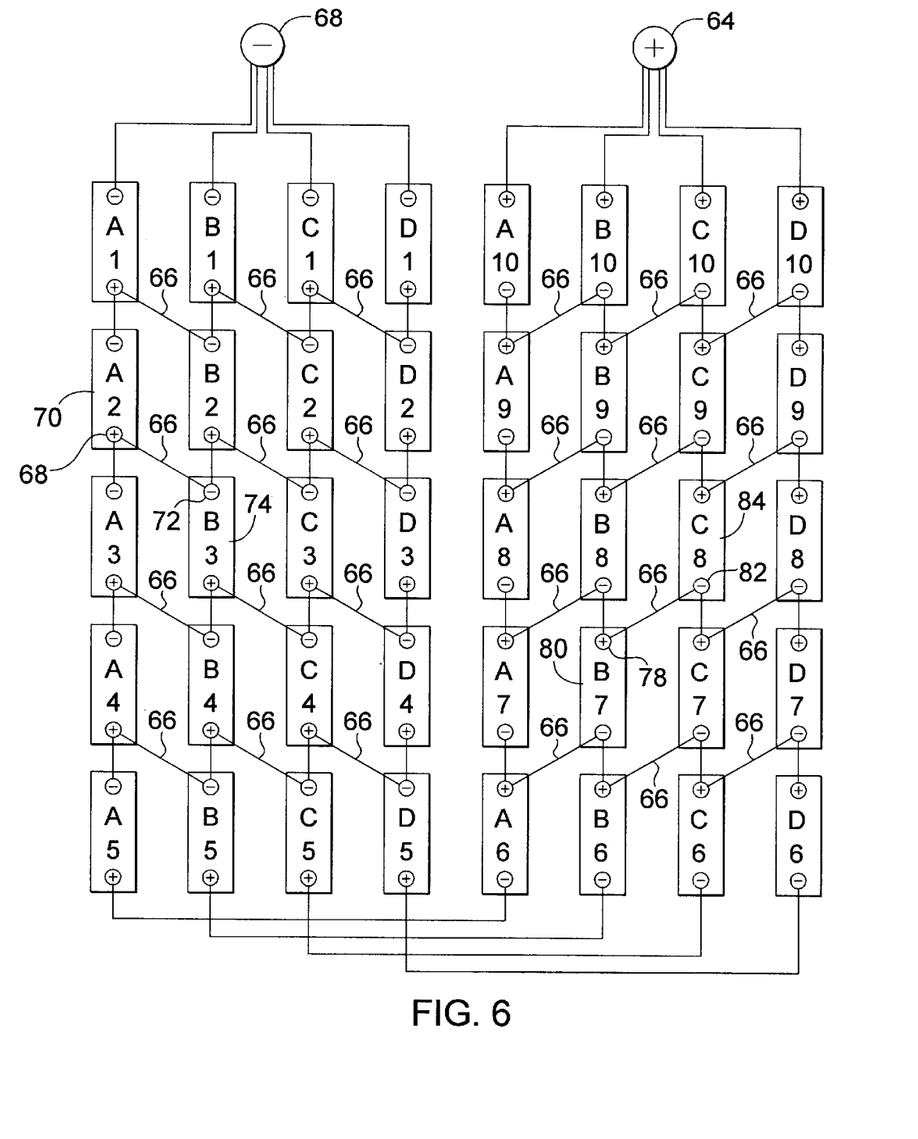
FIG. 6 is an alternate embodiment of the battery network of FIG. 5.

Those skilled in the art will also realize that the particular method used to configure the battery network with the compound series parallel connections described above will not affect the performance of the resulting battery pack. FIG. 6 illustrates an alternate embodiment of the battery network, configured in accordance with principals of this invention, having forty individual component batteries configured with compound series parallel connections. Although the network effectively comprises four strings of ten batteries connected in series, each string is physically divided in half and reverses direction so that positive terminal 64 and negative terminal 68 for the entire battery pack are on the same side of the pack.

Additionally, the compound interconnections 66 in the battery network illustrated in FIG. 6 run from the positive electrode of each individual component battery 12 to the adjacent negative electrode of the individual component battery in the adjacent row and adjacent column. For example, a compound interconnection is located between the positive electrode 68 of battery 70 (A,2) and the negative electrode 72 of battery 74 (B,3). Likewise, a compound interconnection is located between the positive electrode 78 of battery 80 (B,7) and the negative electrode 82 of battery 84(C,8).

Despite these structural differences present in the battery network illustrated in FIG. 6, the resulting battery network is functionally and operationally identical to the network illustrated in FIG. 5. More specifically, the negative electrode of each individual component battery in the network is operatively connected in series to the adjacent positive electrode of the individual component battery in the adjacent row of the network, and operatively connected in parallel to the adjacent negative electrodes of the individual component batteries in that same row of the network. The positive electrode of each individual component battery is operatively connected in series to the adjacent negative electrode of the individual component battery in the adjacent row of the network, and operatively connected in parallel to the adjacent positive electrodes of the individual component batteries in that same row of the network.

The compounded connections of the individual batteries produces a battery network which is independent of the battery type, self balancing, more stable, and fault tolerant.

One of the primary advantages of the battery network described above is that it is battery-type independent. In other words, the same general advantages will be realized regardless of the specific type of battery used for the individual component batteries in the network. For example, as described above, lead-acid batteries are presently used for the individual component batteries. However, as advances in battery technologies continue to be made, other types of batteries, such as lithium-ion, nickel-iron, nickel-cadmium, nickel-hydrogen, nickel-zinc, zinc-chloride, zinc-bromide, zinc-air, or lithium-ion solid polymer batteries may alternatively be used for the individual component batteries in the network.

Another advantage of using, for example, lithium-ion batteries instead of the lead-acid batteries is the significant increase in the specific energy of the batteries. Specific energy is a measure of the total amount of energy in watt-hours (Wh) a battery can store per kilogram of its mass for a specific rate of discharge, and is an important factor in determining the operating range or distance that a battery pack can provide to an EV. The specific energy for conventional lead-acid batteries ranges from about 24 Wh/kg to about 50 Wh/kg. By way of contrast, the specific energy for lithium-ion batteries is about 500 Wh/kg. Therefore, the resulting range available from a battery network using lithium-ion batteries as the individual component batteries will be on the order of ten times greater than the range available from a network using conventional lead-acid batteries.

Additionally, the battery network according to the present invention addresses the fundamental and inherent weaknesses described above of the most common method of constructing high voltage battery packs, namely connecting a number of large monolithic batteries in series to produce the desired total pack voltage. The battery network according to the present invention, configured with compound series and parallel connections, is fundamentally more stable with respect to the individual component battery failures and individual component battery capacity differences.

Because of the compounded interconnection 16 in FIG. 3C, if one or more individual battery in the network fails, the current in the column(s) corresponding to the failed battery (s) will flow around the failed battery(s) through a different column. In effect, the failed battery(s) becomes redundant without impacting the total output current or output voltage of the network. As a result, the battery network is a fault-tolerant network with a low probability of failure of the entire network. The failure rates for the entire battery network can be calculated on the basis of the failure rates of the individual component batteries and the geometry of the battery network.

Figure 7:
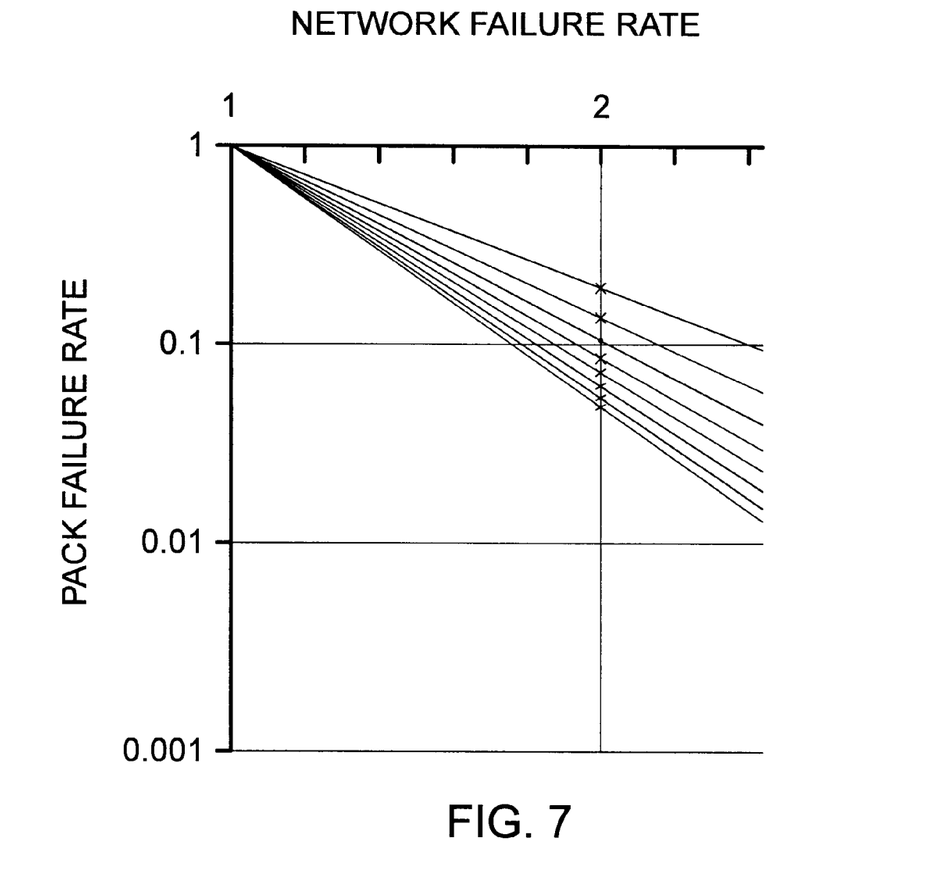
FIG. 7 is a graph of illustrating battery pack failure rate of the battery network of FIG. 2 for different values of X and Y.

The data presented in FIG. 7 was calculated for a X by Y battery array, where X represents the parallel connection dimension (i.e. the number of columns) and Y represents the series connection dimension (i.e. the number of rows). The failure rate for individual component batteries is assumed to be 1/Y. Failure, for the purposes of this analysis, represents a catastrophic battery failure resulting in an open circuit condition. Given these assumptions, each series dimension or column of the battery array will, on average, contain one component battery that has failed, since the failure rate is 1/Y. Total battery pack failure will occur where all of the component battery failures are contained in a single parallel dimension or row in the battery array. In this case, no current flow can occur during either discharge or re-charge of the battery network.

For a X by Y battery array, the total number of component battery failures will be XY(1/Y)=X. The total number of combinations of battery failures in this array is (XY!)/(XY-X)!. The total number of combinations of battery failures that result in total pack failure is equal to the number of failure combinations in which all of the failures occur in a single parallel dimension or row of the battery array, that is X!Y. Thus, the probability of total battery pack failure is then (X!Y)/(XY!)/(XY-X)!.

An analysis of the data presented in FIG. 7 illustrates the advantages of the battery network geometry of this invention. For all values of Y, the total pack failure rate is 100% where X=1. Since the failure rate assumed in these calculations is 1/Y, a single string of batteries will always contain one failed component battery and the total pack will fail. However, for values of Y greater than 1, the total pack failure rate decreases rapidly as values of X increase. Increasing the parallel dimension (X) to a value of 3 or greater decreases the probability of total pack failure to 10% or less for all values of Y greater than 1.

For example, the network failure rate for a single string of ten batteries in sequence, assuming a 1/Y battery failure rate, is 100%. Increasing the number of strings in the network to two strings connected with the compound series parallel connections of this invention causes the network failure rate to drop to about 5%. If the number of strings is further increased to three and four strings connected with compound series parallel connections, the resulting network failure rate drops to about 0.2% and 0.01% respectively.

By increasing the degree of parallelism within a battery pack of fixed capacity, the reliability of the pack will be dramatically increased. The overall capacity of the battery pack will, of course, by reduced by individual component battery failures but will not be reduced to zero as in the case of a single linear series string (X=1). The cost of parallelism in constructing the battery pack is an increased number of compound series/parallel interconnections within the battery pack. These connections are simple mechanical connections using electrical conductors of sufficient current carrying capacity. The mechanical interconnections are much more reliable than the individual component batteries and the failure rate of such compound interconnections is much lower than the intrinsic battery failure rate. Those skilled in the art will realize that the results of the analysis presented in FIG. 7 also apply to individual component battery failure rates other than 1/Y.

Moreover, a battery network having the compound series parallel configuration described above is self-balancing. In general, when two or more batteries are connected in parallel, they automatically balance themselves with respect to their effective output voltages. Thus, when a plurality of voltage mismatched individual component batteries are connected in the compound series parallel configuration described above, using the compound interconnection 16 in FIG. 3C, the mismatched individual component batteries automatically balance themselves.

This self-balancing advantage of the present invention is of a great practical importance because there is usually a substantial mismatch between voltages of individual batteries. For example, when the 12V UPS batteries are received from a supplier, they can be mismatched in terms of voltage by as much as 300–400 mV. As a result, any one of the individual component batteries may provide a voltage reading from about 12.8–13.2V. However, once the individual batteries are connected together in the compound series parallel configuration of this invention, they automatically balance each other to within about 2.5 millivolts. The self-balancing feature of the individual component batteries in the network eliminates the risk of any one battery randomly degrading, and therefore significantly increases the cycle life of the overall battery pack.

Another significant advantage resulting from the compound interconnections and the self-balancing is that the battery pack is capable of effectively operating as a low-current energy source. By way of contrast to the high voltage, high current prior art battery packs, one embodiment of the compound series parallel battery network is a 120V, 48A system that operates on about 20A. As a result, in a four string network, only about 5A are being pulled through each string on average. The low current requirements of the battery network reduces the depth of discharge experienced by the batteries, and thus increases the cycle life of the individual component batteries in the network and the cycle life of the battery pack as a whole. Present embodiments of the battery pack of this invention are exhibiting a cycle life of over 1000 cycles, which is significantly higher than prior art systems.

Furthermore, the modular configuration of the battery network makes it possible to selectively optimize the energy providing capacity of the network based on the particular requirements of an application. Depending on the particular application, additional individual component batteries can be added to each string and/or additional strings of batteries can be added to the network. For example, if the battery operating system is being utilized as an energy source for an electric all terrain vehicle (ATV), the battery network may only require two strings of batteries configured with compound series parallel connections. On the other hand, if the battery operating system is being utilized as an energy source for a more demanding application such as an electric golf cart, the battery network may contain four strings of batteries, and possibly eight strings of batteries for a electric car.

Yet another advantage of the described battery operating system is the significant reduction in weight of the system.

For example, a battery pack comprising 40 individual component batteries configured according to the present invention, such as that illustrated in FIG. 5, only weights around 576 lbs, less than half of the weight of the EV1 battery pack.

While specific embodiments of this invention has been shown and described, it would be apparent to those skilled in the art that many modifications are possible without departing from the inventive concept herein. For example, although the present invention has been described and illustrated as a two-dimensional network of batteries, those skilled in the art should realize that the two dimensional network having X columns and Y rows is a subclass of a three dimensional network of individual component batteries having X columns, Y rows, and Z levels, wherein Z is equal to 1. Therefore, it should be readily apparent that a plurality of two-dimensional battery networks configured with compound series parallel interconnections may be further configured such that each of the networks is stacked or layered relative to the other networks to form a three-dimensional battery network. It is therefore to be understood that this invention may be practiced otherwise than as specifically described.

What is claimed is:

1. A plurality of battery interconnection networks electrically connected to one another to provide a three-dimensional network of batteries, wherein each of said interconnection networks comprise a battery interconnection network having a plurality of individual component batteries configured with compound series parallel connections, comprising:
    a plurality of rows of individual component batteries, each row having a plurality of the individual component batteries connected in parallel; and
    a plurality of columns of individual component batteries interconnected with the plurality of rows of individual component batteries, each column having a plurality of the individual component batteries connected in series, wherein each of the plurality of individual component batteries in the network is electrically connected in series with an adjacent individual component battery in the same column and electrically connected in parallel with an adjacent individual component battery in the same row.

2. The battery interconnection network of claim 1, wherein each of the plurality of individual component batteries comprises a positive electrode and a negative electrode, and wherein for each of the plurality of columns, the positive electrode of each of the plurality of individual component batteries in the column is connected in series with the negative electrodes of adjacent individual component batteries in the same column.

3. The battery interconnection network of claim 2, wherein for each of the plurality of rows, the positive electrode of each of the plurality of individual component batteries in the row is connected in parallel with the positive electrodes of adjacent individual component batteries in the same row, and the negative electrode of each of the plurality of individual component batteries in the row is connected in parallel with the negative electrodes of adjacent individual component batteries in the same row.

4. The battery interconnection network of claim 1, wherein the network failure rate is less than about 10%.

5. The battery interconnection network of claim 1, wherein the network failure rate is less than about 5%.

6. The battery interconnection network of claim 1, wherein the network failure rate is less than about 1%.

7. The battery interconnection network of claim 1, wherein the voltage of any one of the individual component batteries in the network is matched to within about 10 millivolts of the voltage of any other individual component battery in the network immediately after the individual component batteries are configured with the compound series parallel connections.

8. The battery interconnection network of claim 1, wherein the voltage of any one of the individual component batteries in the network is matched to within about 4 millivolts of the voltage of any other individual component battery in the network immediately after the individual component batteries are configured with the compound series parallel connections.

9. The battery interconnection network of claim 1, wherein the network is configured to provide a voltage in the range of about 110 volts to about 200 volts.

10. The battery interconnection network of claim 1, wherein the network is configured to provide about 120 volts.

11. The battery interconnection network of claim 1, wherein at least some of the plurality of individual component batteries are lithium-ion batteries.

12. A fault-tolerant battery pack for an electric vehicle, the battery pack comprising:
    an array of individual component batteries, each of the individual component batteries having a positive electrode and a negative electrode,
    wherein the array of individual component batteries is configured with compound series parallel connections into a network having a plurality of columns and a plurality of rows,
    wherein each of the plurality of columns includes an individual component batteries electrically connected together in series, such that the positive electrode of each of the individual component batteries in a column is connected in series to the negative electrode of an adjacent individual component battery in the same column,
    wherein each of the plurality of columns are electrically connected together in parallel with the other columns, and
    wherein, in each of the plurality of rows, each of the individual component batteries is electrically connected together in parallel with any adjacent individual component batteries in the same row, such that the positive electrode of each of the individual component batteries in the row is connected in parallel with the positive electrode of any adjacent individual component batteries in the same row and the negative electrode of each of the individual component batteries in the row is connected in parallel with the negative electrode of any adjacent individual component batteries in the same row thereby providing a three-dimensional network of batteries.

13. A method of interconnecting a plurality of individual component batteries for use in an electric vehicle comprising the steps of:
    connecting subsets of the plurality of individual component batteries in series to form a plurality of columns of batteries, each of the plurality of columns of batteries having a subset of the plurality of individual component batteries connected in series;
    connecting the plurality of columns of batteries in parallel to form a network of columns of batteries and rows of batteries; and configuring each of the individual component batteries in the network with a compound interconnection, wherein each of the individual component batteries is connected in parallel with all adjacent individual component batteries in the same row of batteries thereby providing a three-dimensional network of batteries.

* * * * *